Aug. 22, 1939    G. GRUBER    2,170,051
SUPPORT FOR CANDY MOLDS
Filed Sept. 20, 1937

INVENTOR
George Gruber
BY
ATTORNEY

Patented Aug. 22, 1939

2,170,051

UNITED STATES PATENT OFFICE 2,170,051

SUPPORT FOR CANDY MOLDS

George Gruber, Linden, N. J.

Application September 20, 1937, Serial No. 164,739

4 Claims. (Cl. 248—180)

This invention relates to new and useful improvements in supports for molds for candy to be used for advertising purposes.

The invention has for an object the construction of a support for a mold by which candy or chocolate may be molded in the form of an article such as a well reproduced miniature automobile, or monogram which may be used for advertising purposes.

More specifically, the invention contemplates to so construct the support for the mold that advertising articles such as plaques, letters, and the like may be made.

Still further the invention contemplates to characterize the support for the mold by the fact that these plaques, letters, and other articles of varying thicknesses from end to end may be made, to add to their advertising value by attracting attention.

Still further the invention proposes an annular member adapted to support a candy mold and an arrangement for holding the annular member in various pre-determined tilted positions by which the varying thicknesses of the molded candy is determined.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figures 1, 2:
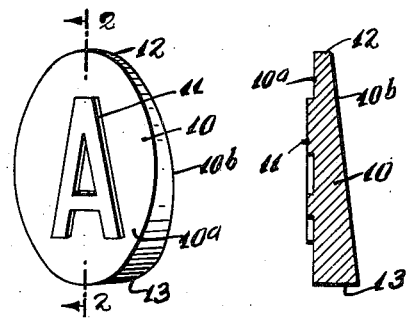
Fig. 1 is a perspective view of a candy plaque constructed according to this invention.
Fig. 2 is a vertical sectional view taken on the line 2—2 of Fig. 1.

In Figs. 1 and 2 a plaque of candy 10 is illustrated having a straight front side 10$^a$ formed with an outward projecting letter 11, and having an inclined back side 10$^b$ to form a thin edge 12 at one side of the plaque, and a thick edge 13 to the other side of the plaque.

Figure 3:
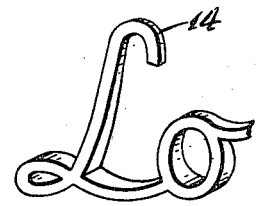
Fig. 3 is a perspective view of a few letters of candy constructed according to this invention.

In Fig. 3, several candy letters 14 are illustrated also constructed according to this invention.

Figure 4:
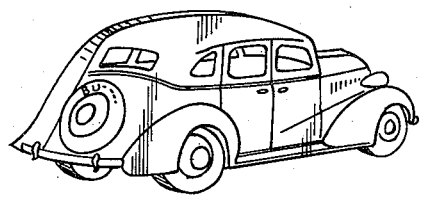
Figs. 4 and 5 are perspective views of other forms of advertising candy plaques constructed according to this invention.
Figure 5:
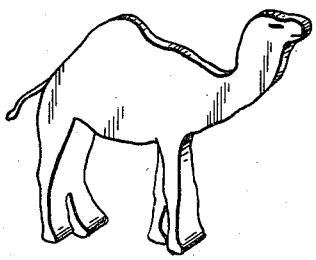

In Fig. 4 a candy advertising automobile and in Fig. 5 a candy advertising animal is illustrated also constructed according to this invention.

Figure 6:
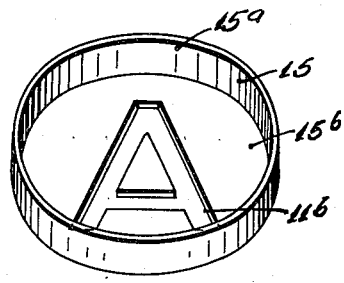
Fig. 6 is a perspective view of the mold used in making the plaque shown in Figs. 1 and 2.

In Fig. 6 a mold 15 is illustrated in which the candy plaque illustrated in Figs. 1 and 2 was made. This mold has an open top 15$^a$ and its bottom face 15$^b$ is formed with the embossed letter 11$^b$. The molten candy is placed into the mold and allowed to harden.

Figure 7:
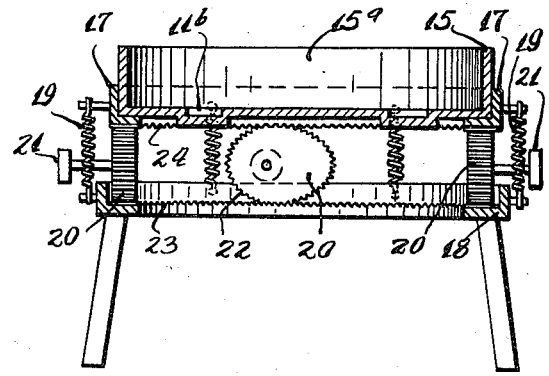
Fig. 7 is a transverse vertical sectional view of the mold supporting means according to this invention.

In Fig. 7 a means is illustrated for holding the mold in slightly tilted positions to obtain the inclined back side of the plaque or letters, as previously described. This means comprises an annular member 17 upon which the mold 15 may be rested. This annular member 17 is superimposed above an annular base 18. Resilient means, such as springs 19, are connected between the annular member and the annular base at spaced positions to urge these parts together. Interposed between the annular member and annular base there are several cams 20. Each of these cams has a projecting handle 21 by which it may be manipulated. Each of these cams has a serrated or roughened periphery 22 adapted to engage serrated or roughened portions 23 and 24 upon the opposed faces of the annular base 18 and the annular member 17, respectively.

The cams 20 may be selectively positioned to control the tilt of the annular member 17. For example, the annular member 17 may be forced upwards at one area and the cam 20 at this area adjusted to hold the side of the annular member in the raised position. At the other side the cams 20 may be moved to lower that side of the annular member 17, or the cams 20 may be selectively removed to allow certain portions of the annular member and the annular base to touch each other. Thus it is possible to control the tilt of the annular member 17, which in turn controls the tilt of the mold 15. When candy is poured into the mold it will seek a level position, and since the mold is tilted the finished candy form will vary in thickness, depending on the tilt.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device of the class described, comprising an annular member, for supporting a candy mold, an annular base beneath said member, resilient means urging said annular member downwards against said base, and cam elements engaged between said member and base for holding the member in selected tilted positions.

2. A device of the class described, comprising an annular member, for supporting a candy mold, an annular base beneath said member, resilient means urging said annular member downwards against said base, and cam elements engaged between said member and base for holding the member in selected tilted positions, said cams being provided with serrated peripheries adapted to engage serrated portions of said annular member and base member so that the cams may be firmly held in various adjusted positions to control the tilting position of the annular member.

3. In a device of the class described, a member for supporting a candy mold, a base beneath said member, means urging said member towards said base, and means operative between the adjacent faces of said member and said base to hold said member in various tilted positions with relation to said base.

4. In a device of the class described, a member for supporting a candy mold, a base beneath said member, means urging said member towards said base, and means operative between the adjacent faces of said member and said base to hold said member in various tilted positions with relation to said base, said first-mentioned means comprising pegs extending from the outer peripheries of said member and said base, and contraction springs having their ends attached to said pegs.

GEORGE GRUBER.